United States Patent
Sawayama

(10) Patent No.: US 8,843,261 B2
(45) Date of Patent: Sep. 23, 2014

(54) REGENERATION CONTROL DEVICE, HYBRID VEHICLE, REGENERATION CONTROL METHOD, AND COMPUTER PROGRAM

(75) Inventor: Akira Sawayama, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 26 days.

(21) Appl. No.: 13/813,136

(22) PCT Filed: Oct. 20, 2011

(86) PCT No.: PCT/JP2011/074125
§ 371 (c)(1),
(2), (4) Date: Jan. 29, 2013

(87) PCT Pub. No.: WO2012/096044
PCT Pub. Date: Jul. 19, 2012

(65) Prior Publication Data
US 2013/0138286 A1 May 30, 2013

(30) Foreign Application Priority Data
Jan. 13, 2011 (JP) .................................. 2011-005289

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 10/26* | (2006.01) | |
| *B60W 30/18* | (2012.01) | |
| *B60W 20/00* | (2006.01) | |
| *B60L 7/16* | (2006.01) | |
| *B60L 15/20* | (2006.01) | |
| *B60W 10/06* | (2006.01) | |
| *B60W 10/08* | (2006.01) | |
| *B60L 11/18* | (2006.01) | |
| *B60K 6/48* | (2007.10) | |
| *B60W 10/02* | (2006.01) | |

(52) U.S. Cl.
CPC ............... *B60W 10/06* (2013.01); *B60W 10/26* (2013.01); *Y02T 10/7005* (2013.01); *B60W 30/18136* (2013.01); *B60Y 2300/92* (2013.01); *B60W 2710/246* (2013.01); *Y02T 10/7044* (2013.01); *B60W 20/00* (2013.01); *B60L 7/16* (2013.01); *B60W 2510/246* (2013.01); *B60L 15/2054* (2013.01); *Y02T 10/705* (2013.01); *B60W 10/08* (2013.01); *B60W 2510/1005* (2013.01); *Y10S 903/93* (2013.01); *B60L 11/187* (2013.01); *B60W 30/18127* (2013.01); *Y02T 10/6221* (2013.01); *B60L 11/1861* (2013.01); *B60K 6/48* (2013.01); *B60W 10/02* (2013.01)
USPC .................. 701/22; 701/1; 701/70; 180/65.1; 180/65.21; 180/65.31; 903/930

(58) Field of Classification Search
CPC ................ B60W 10/08; B60W 20/00; B60W 30/18127; B60W 10/26; B60W 2510/244; B60W 2510/246; B60L 11/187; B60L 7/10; B60L 3/0046; B60L 11/1861; B60L 2240/36; B60L 11/1887
USPC ........... 701/1, 22, 70; 180/65.1, 65.21, 65.31; 903/902, 903, 907, 947
See application file for complete search history.

(56) References Cited

U.S. PATENT DOCUMENTS

2012/0245781 A1* 9/2012 Kanamori et al. .............. 701/22

FOREIGN PATENT DOCUMENTS

JP 2010-269642 A 12/2010

OTHER PUBLICATIONS

International Search Report of the corresponding International Application, PCT/JP2011/074125 dated Nov. 15, 2011.

*Primary Examiner* — Rami Khatib
(74) *Attorney, Agent, or Firm* — Cowan, Liebowitz & Latman, P.C.; Mark Montague

(57) ABSTRACT

The present invention suppresses a battery temperature increase while suppressing a decrease in battery SOC. The present invention has: a temperature sensor that detects the temperature of the battery; and a hybrid ECU that, when the temperature sensor has detected a battery temperature that is equal to or exceeds a predetermined temperature, controls in a manner so that an engine and an electric motor are connected during regenerative power generation during deceleration. The hybrid ECU sets the predetermined temperature in accordance with the gear stage number during hybrid vehicle deceleration.

8 Claims, 4 Drawing Sheets ated by the electric motor. The regeneration torque functions as braking force during the deceleration of the hybrid vehicle (for example, see Patent Literature 1). At that time, for an efficient regenerative power generation by the electric motor, the hybrid vehicle is controlled to disconnect the engine from the electric motor in order to disconnect the engine from the driving system of the hybrid vehicle and eliminate the braking force by the engine brake so that the electric motor can perform regenerative power generation with a maximum regeneration torque (or, namely, a maximum electric power regeneration).

REGENERATION CONTROL DEVICE, HYBRID VEHICLE, REGENERATION CONTROL METHOD, AND COMPUTER PROGRAM

CROSS REFERENCE TO RELATED APPLICATIONS

This is a U.S. national stage of application No. PCT/JP2011/074125, filed on Oct. 20, 2011. Priority under 35 U.S.C. §119(a) and 35 U.S.C. §365(b) is claimed from Japanese Patent Applications No. 2011-005289 filed on Jan. 13, 2011, the disclosure of which is also incorporated herein by reference.

TECHNICAL FIELD

The present invention relates to a regeneration control device, a hybrid vehicle, a regeneration control method, and a computer program.

BACKGROUND ART

A hybrid vehicle includes an engine and an electric motor and is capable of running by the engine or the electric motor, or is capable of running by the cooperation between the engine and the electric motor. In that case, during the deceleration of the hybrid vehicle, the electric motor is rotated by the turning force of the wheel and functions as an electric generator so that the battery of the hybrid vehicle can be charged (it is referred to as regenerative power generation). When the electric motor performs regenerative power generation, as described above, regeneration torque is generated at the electric motor in proportion to the electric power regener- On the other hand, the temperature of the battery increases because chemical reactions are often caused under the condition in which the electric power is often transferred to and from the battery since a nickel hydride battery or the like is used as the battery. It is necessary to perform the regenerative power generation in which the electric power is moderately regenerated under a condition in which the temperature of the battery is high as described above. Then, in that case, such a control is performed as to connect the engine to the electric motor in order to obtain the braking force of the hybrid vehicle as the sum of the braking force by the engine brake and the braking force by the regeneration torque, and in order to keep the electric power regeneration of the electric motor low.

CITATION LIST

Patent Literature

PTL1: JP 2007-223421 A

SUMMARY OF INVENTION

Technical Problem

Conventionally, a threshold of the temperature of the battery has been predetermined and a control has been performed in order to connect the engine to the electric motor and keep the electric power regeneration of the electric motor low when the temperature of the battery has exceeded the threshold at the regeneration during deceleration. This tapers the increase in the temperature of the battery without damaging the battery. However, the low electric power regeneration to the battery possibly causes the depression of State of Charge (hereinafter, referred to as SOC) of the battery.

In light of the foregoing, an objective of the present invention is to provide a regeneration control device, a hybrid vehicle, a regeneration control method, and a program that can curb the increase in the temperature of the battery while curbing the decrease in the SOC of the battery.

Solution to Problem

An aspect of the vehicle of the present invention is a regeneration control device. The regeneration control device of the present invention is a regeneration control device of a hybrid vehicle that includes an engine, an electric motor and a battery configured to supply electric source to the electric motor, that is capable of running by the engine or the electric motor or capable of running by a cooperation between the engine and the electric motor, that is capable of performing regenerative power generation for charging the battery by the electric motor at least during deceleration, and that is capable of disconnecting the engine from the electric motor in the regenerative power generation during deceleration, and the regeneration control device includes temperature detecting means for detecting a temperature of the battery and control means for controlling to connect the engine with the electric motor in the regenerative power generation during deceleration when the temperature detecting means detects a temperature of the battery that is equal to or exceeds a predetermined temperature, wherein the control means sets the predetermined temperature according to a gear number during the deceleration of the hybrid vehicle.

Further, the control means, after controlling to connect the engine with the electric motor in the regenerative power generation during deceleration when the temperature detecting means detects the temperature of the battery that is equal to or exceeds the predetermined temperature, can control to disconnect the engine from the electric motor in the regenerative power generation during deceleration when the temperature detecting means detects a temperature of the battery that is equal to or less than a predetermined temperature.

Further, the control means can set the predetermined temperature higher at a gear number having a larger gear ratio.

Further, it is preferable that a predetermined temperature that is a threshold when the control means controls to shift a state from the state in which the engine is disconnected from the electric motor to the state in which the engine is connected to the electric motor differs from a predetermined temperature that is a threshold when the control means controls to shift a state from the state in which the engine is connected to the electric motor to the state in which the engine is disconnected from the electric motor, at the same gear number.

Another aspect of the present invention is a hybrid vehicle. The hybrid vehicle of the present invention includes the regeneration control device of the present invention.

Another aspect of the present invention is a regeneration control method. The regeneration control method of the present invention is a regeneration control method of a regeneration control device of a hybrid vehicle that includes an engine, an electric motor and a battery configured to supply electric source to the electric motor, that is capable of running by the engine or the electric motor or capable of running by a cooperation between the engine and the electric motor, that is capable of performing regenerative power generation for charging the battery by the electric motor at least during deceleration, and that is capable of disconnecting the engine from the electric motor in the regenerative power generation during deceleration, and the regeneration control method includes temperature detecting step for detecting a temperature of the battery and control step for controlling to connect the engine with the electric motor in the regenerative power generation during deceleration when a process of the temperature detecting step detects a temperature of the battery that is equal to or exceeds the predetermined temperature, wherein a process of the control step sets the predetermined temperature according to a gear number during the deceleration of the hybrid vehicle.

Another aspect of the present invention is a program. The program of the present invention is for causing an information processing apparatus to implement a function of the regeneration control device of the present invention.

Advantageous Effect of Invention

According to the present invention, the increase in the temperature of the battery can be curbed while the decrease in the SOC of the battery is curbed.

DESCRIPTION OF EMBODIMENTS

Hereinafter, the hybrid vehicle according to an embodiment of the present invention will be described with reference to FIGS. 1 to 4.

Figure 1:
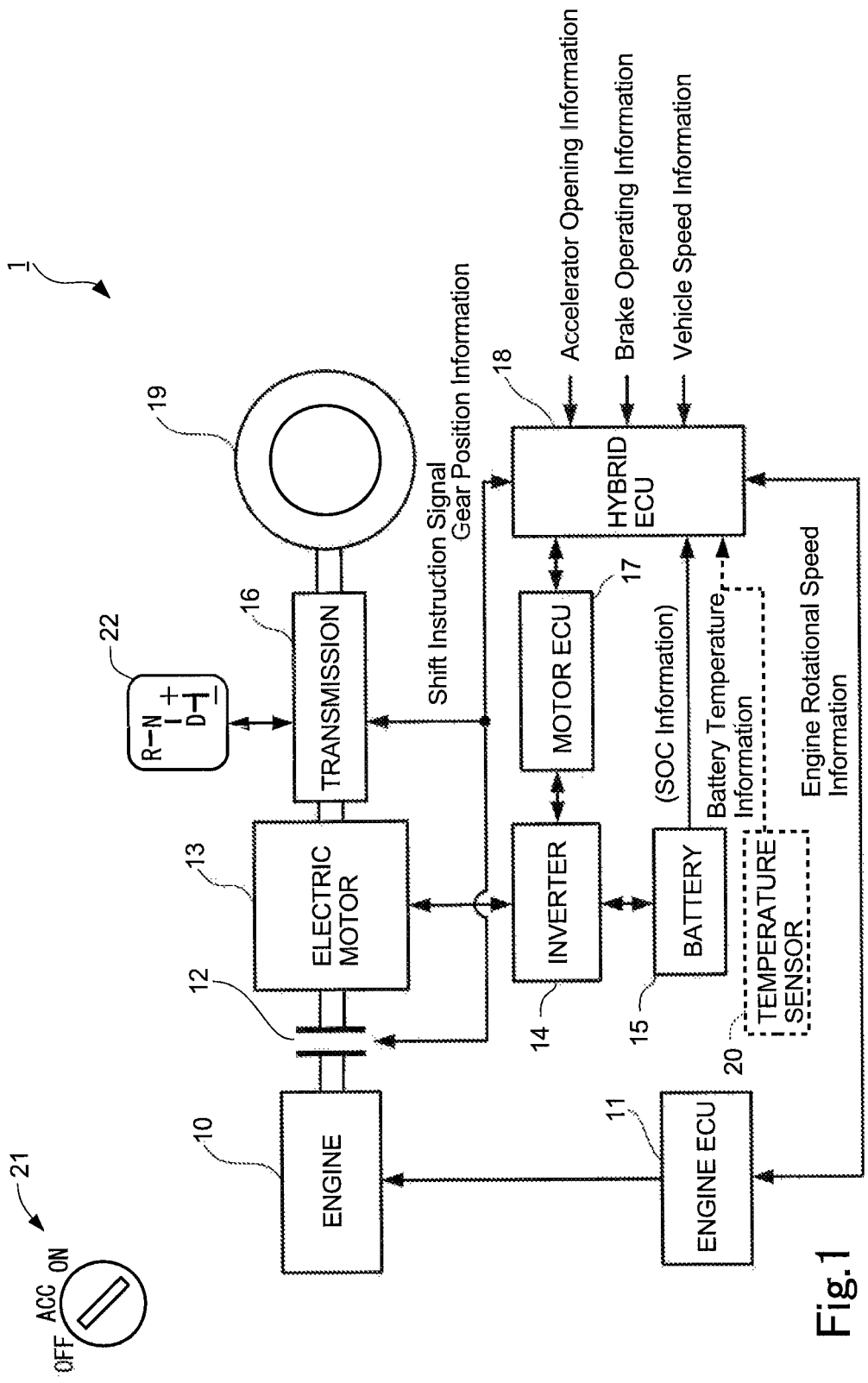
FIG. 1 A block diagram illustrating an exemplary structure of a hybrid vehicle according to an embodiment of the present invention.

FIG. 1 is a block diagram illustrating an exemplary structure of a hybrid vehicle 1. The hybrid vehicle 1 is an example of a vehicle. The hybrid vehicle 1 is driven by an engine (internal combustion engine) 10 and/or an electric motor 13 through a gear box that is a semiautomatic transmission. The electric motor 13 can perform regenerative power generation during deceleration. At that time, the electric motor 13 can generate braking force like an engine brake of the engine 10 with the regeneration torque caused by the regenerative power generation of the electric motor 13. Note that the semiautomatic transmission is a transmission that can automatically shift the gears while having the same structure as a manual transmission.

The hybrid vehicle 1 includes the engine 10, an engine Electronic Control Unit (ECU) 11, a clutch 12, the electric motor 13, an inverter 14, a battery 15, a transmission 16, an electric motor ECU 17, a hybrid ECU 18, a wheel 19, a temperature sensor 20, a key switch 21, and a shift unit 22. Note that the transmission 16 includes the above-mentioned semiautomatic transmission, and is operated by the shift unit 22 including a drive range (hereinafter, referred to as a D (Drive) range). When the shift unit 22 is at the D range, the gear shifting operation of the semiautomatic transmission is automated.

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the electric motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor (micro-computer), a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transmit the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 is in a stopping state or in an idling state and the hybrid vehicle 1 runs by the driving force of the electric motor 13, and when the hybrid vehicle 1 reduces the speed or runs on the down grade and the electric motor 13 generates electric power (regenerates electric power) while the engine 10 is in a stopping state or in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or the hybrid vehicle 1 reduces the speed or runs on the down grade. In that case, electric power is generated by the power for rotating the shaft supplied from the transmission 16 and is supplied to the inverter 14 in order to charge the battery 15. At that time, the electric motor 13 generates the regeneration torque having the amount relative to the electric power regeneration.

The inverter 14 is controlled by the electric motor ECU 17, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power. A proper range of the SOC is determined for the battery 15 and the battery 15 is controlled to maintain the SOC within the range.

The transmission 16 includes a semiautomatic transmission (not shown in the drawings) that selects one of a plurality of gear ratios (change gear ratios) according to the shift instruction signal from the hybrid ECU 18 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle reduces the speed or runs on the down grade. Note that the semiautomatic transmission can also shift the gear position to a given gear number by the driver's hand operation of the shift unit 22.

The electric motor ECU 17 is a computer working in coordination with the engine ECU 11 according to the instructions from the hybrid ECU 18, and controls the electric motor 13 by controlling the inverter 14. For example, the electric motor ECU 17 includes a CPU, an ASIC, a microprocessor (micro-computer), a DSP, and the like, and internally has an operation unit, a memory, an I/O port, and the like.

The hybrid ECU 18 is an example of a computer. For hybrid driving, the hybrid ECU 18 obtains accelerator opening information, brake operation information, vehicle speed information, gear number information, engine rotational speed information, and SOC information. Based on the obtained information, the hybrid ECU 18 controls the clutch 12, and controls the transmission 16 by supplying the shift instruction signal in order to give the control instructions of the electric motor 13 and the inverter 14 to the electric motor ECU 17 and give the control instruction of the engine 10 to the engine ECU 11. The control instructions include a regeneration control instruction described below. For example, the hybrid ECU 18 includes a CPU, an ASIC, a microprocessor (micro-computer), a DSP, and the like, and internally has an operation unit, a memory, an I/O port, and the like.

Note that a program to be executed by the hybrid ECU 18 can be installed on the hybrid ECU 18 that is a computer in advance by being stored in a non-volatile memory inside the hybrid ECU 18 in advance.

The engine ECU 11, the electric motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The temperature sensor 20 is a sensor configured to detect the temperature of the battery 15. Note that the battery 15 is, for example, a nickel hydride battery. The increase in the temperature of the battery 15 is caused by the chemical reaction with the transfer of the electric power from and to the battery 15. Thus, although the temperature sensor 20 is for detecting the internal temperature of the battery 15, the internal temperature of the battery 15 can also indirectly be detected by detecting the temperature of the chassis of the battery 15 or the ambient temperature just close to the battery 15. Further, various types of temperature sensors can be used.

The key switch 21 is a switch that is turned ON/OFF, for example, by insertion of a key by the user at the start of drive. Turning ON the key switch 21 activates each unit of the hybrid vehicle 1, and turning OFF the key switch 21 stops each unit of the hybrid vehicle 1.

As described above, the shift unit 22 is for giving the instruction from the driver to the semiautomatic transmission of the transmission 16. When the shift unit 22 is at the D range, the gear shifting operation of the semiautomatic transmission is automated.

Figure 2:
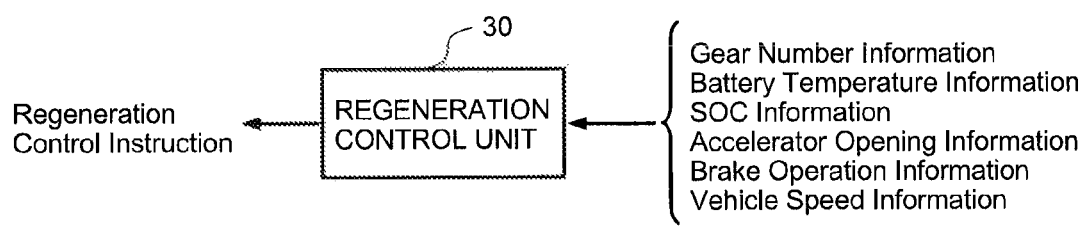
FIG. 2 A block diagram illustrating an exemplary configuration of a function implemented in a hybrid ECU illustrated in FIG. 1.

FIG. 2 is a block diagram for illustrating an exemplary configuration of a function implemented in the hybrid ECU 18 executing a program. In other words, when the hybrid ECU 18 executes a program, the function of the regeneration control unit 30 is implemented.

The regeneration control unit 30 is a function for giving the instruction about a regeneration control to the engine ECU 11, the clutch 12, and the electric motor ECU 17 based on the gear number information, battery temperature information, the SOC information, the accelerator opening information, the brake operation information, and the vehicle speed information. For example, the regeneration control unit 30 selects the increase threshold or the decrease threshold described below according to the gear number information, controls the shift between clutch disengaged regeneration and clutch engaged regeneration according to the battery temperature information, and determines according to the accelerator opening information, the brake operation information, and the vehicle speed information whether the hybrid vehicle 1 is reducing the speed.

Next, the process for the regeneration control performed in the hybrid ECU 18 executing the program will be described with reference to the flowchart illustrated in FIG. 3. Note that the flow from step S1 to step S7 in FIG. 3 is a cycle of the process, and is repeatedly performed as long as the key switch 21 is the ON state.

Figure 3:
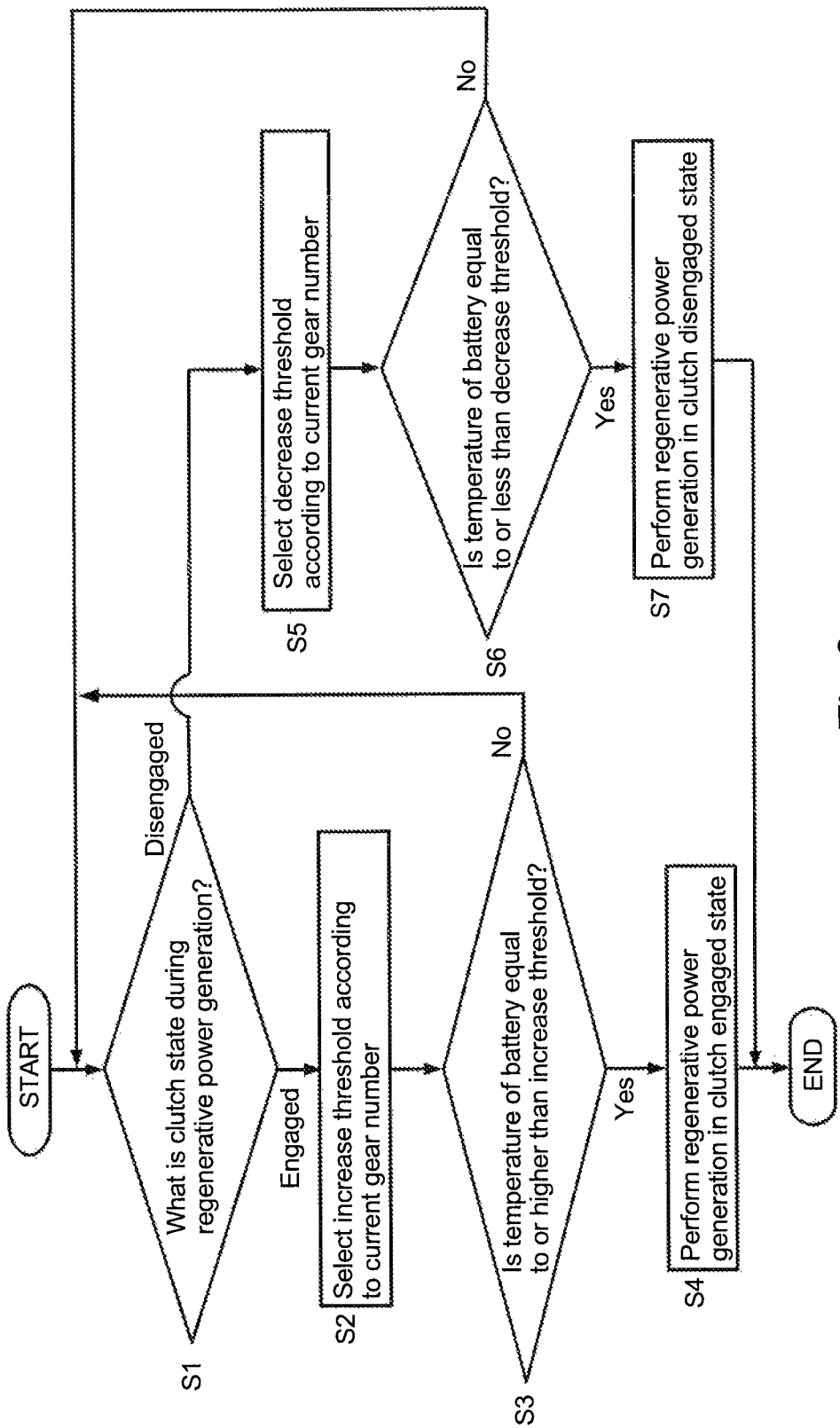
FIG. 3 A flowchart illustrating a process of a regeneration control unit illustrated in FIG. 2.

In the "START" illustrated in FIG. 3, the key switch 21 is the ON state, the hybrid ECU 18 has executed a program, and a function of the regeneration control unit 30 is implemented by the hybrid ECU 18. Then, the process goes to step S1.

In step S1, the regeneration control unit 30 determines whether the clutch 12 is in the disengaged state or in the engaged state when the electric motor 13 performs regenerative power generation. When it is determined in step S1 that the clutch 12 is in the disengaged state, the process goes to step S2. On the other hand, when it is determined in step S1 that the clutch 12 is in the engaged state, the process goes to step S5.

In step S2, the regeneration control unit 30 selects an increase threshold according to the current gear number, and the process goes to step S3. Note that the increase threshold will be described below with reference to FIG. 4.

In step S3, the regeneration control unit 30 determines whether the temperature of the battery 15 is equal to or larger than the increase threshold. When the clutch 12 is in the disengaged state in step S1, regeneration is performed and the temperature of the battery 13 increases. In other words, when the temperature of the battery 13 increases as described above, the increase threshold is selected as the temperature threshold of the battery 13 in step S2. The temperature of the battery 15 is compared with the increase threshold in step S3. When it is determined in step S3 that the temperature of the battery 15 is equal to or larger than the increase threshold, the process goes to step S4. On the other hand, when it is determined in step S3 that the temperature of the battery 15 is less than the increase threshold, the process goes back to step S1.

In step S4, the regeneration control unit 30 makes the clutch 12 to be in the engaged state in order to cause the electric motor 13 to perform regenerative power generation and finishes a cycle of the process (END).

In step S5, the regeneration control unit 30 selects a decrease threshold according to the current gear number, and the process goes to step S6. Note that the decrease threshold will be described below with reference to FIG. 4.

In step S6, the regeneration control unit 30 determines whether the temperature of the battery 15 is equal to or less than the decrease threshold. When it is determined in step S6 that the temperature of the battery 15 is equal to or less than the decrease threshold, the process goes to step S7. On the other hand, when it is determined in step S6 that the temperature of the battery 15 exceeds the decrease threshold, the process goes back to step S1.

In step S7, the regeneration control unit 30 makes the clutch 12 to be in the disengaged state in order to cause the electric motor 13 to perform regenerative power generation and finishes a cycle of the process (END).

Figure 4:
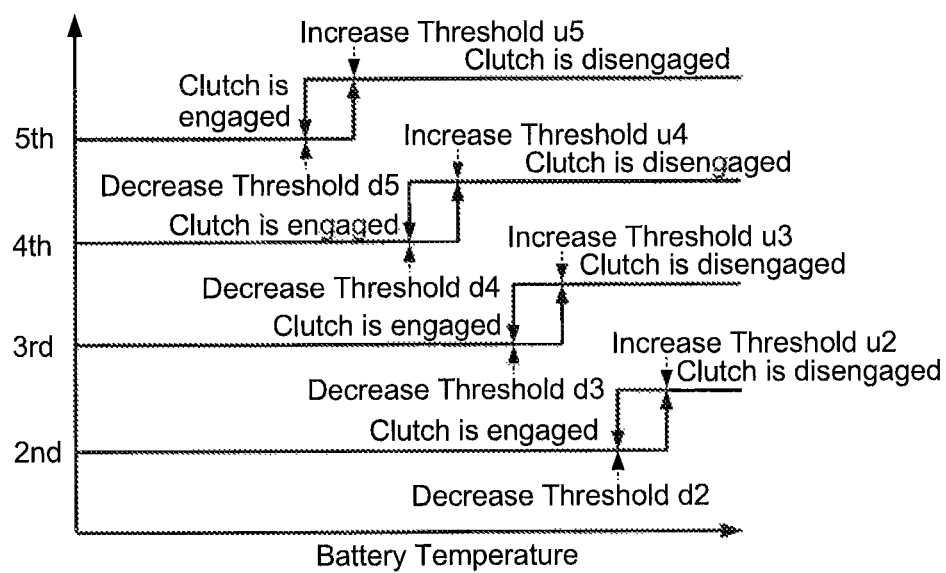
FIG. 4 A view illustrating increase thresholds and decrease thresholds used for the process of the regeneration control unit illustrated in FIG. 2.

Next, the increase threshold and the decrease threshold will be described with reference to FIG. 4. As illustrated in FIG. 4, an increase threshold u2 and a decrease threshold d2 are set when the gear number is at a second speed (2nd). Further, an increase threshold u3 and a decrease threshold d3 are set when the gear number is at a third speed (3rd). Further, an increase threshold u4 and a decrease threshold d4 are set when the gear number is at a fourth speed (4th). Further, an increase threshold u5 and a decrease threshold d5 are set when the gear number is at a fifth speed (5th).

As for the magnitude relationships among the increase thresholds u2, u3, u4, and u5, and the decrease thresholds d2, d3, d4, and d5, first magnitude relationships are u5<u4<u3<u2, and d5<d4<d3<d2.

Second magnitude relationships are d5<u5, d4<u4, d3<u3, and d2<u2.

In other words, in both of the increase thresholds u2, u3, u4, and u5, and the decrease thresholds d2, d3, d4, and d5 at the first magnitude relationships, the larger the gear ratio is, the larger the value is. The reason will be described below.

As for the frictions when the wheel 19 causes the electric motor 13 to rotate during the deceleration of the hybrid vehicle 1, for example, when the second speed at which the gear ratio is the largest is compared with the fifth speed at which the gear ratio is the smallest, the friction at the second speed is larger than that at the fifth speed. It is also seen from the fact that the braking force of the engine brake at the second speed is larger than the braking force of the engine brake at the fifth speed. Accordingly, when the hybrid vehicle 1 reduces the speed at the second speed, the speed of the hybrid vehicle 1 is reduced in a short time. However, when the hybrid vehicle 1 reduces the speed at the fifth speed, the speed of the hybrid vehicle 1 is not reduced in a short time. Thus, at the gear number having the larger gear ratio, the amount of the regenerative power generation of the electric motor 13 becomes smaller during the deceleration of the hybrid vehicle 1. When it is applied to the rate of increase in the temperature of the battery 15, the rate of increase becomes smaller at the gear number having the larger gear ratio. Thus, because a rapid increase of the temperature does not occur at the gear number having the larger gear ratio, there is no problem if the increase threshold is set near the limit temperature of the battery 15 and the increase threshold can be relatively high.

Further, in the second magnitude relationships, the increase thresholds are larger than the decrease thresholds at all of the gear numbers. The second magnitude relationships are for preventing the increase threshold and the decrease threshold from corresponding to each other. If the increase threshold and the decrease threshold correspond to each other, the phenomenon referred to as mode hunting in which the clutch disengaged state and the clutch engaged state are frequently shifted to each other will be caused by the microscopic fluctuations of the temperature of the battery 15 around the threshold. Consequently, the control will fall into undesirable condition. In other words, the process for synchronizing the rotational speed of the engine 10 and the rotational speed of the electric motor 13 with each other is required to shift the clutch state from the clutch disengaged state to the clutch engaged state. At that time, the rotational speed of the engine 10 that is in the idling state when the clutch is in the disengaged state needs to be increased to a rotational speed higher than the idling state in order to synchronize the rotational speed with the rotational speed of the electric motor 13 before the clutch state is shifted to the clutch engaged state. This process for the synchronization leads to the increase in the fuel consumption. To avoid the mode hunting described above, it is preferable that the increase threshold and the decrease threshold do not correspond to each other. In consideration of the foregoing, the increase threshold is set larger than the decrease threshold at every gear number.

(Effect)

The disengagement and the engagement of the clutch 12 can be controlled according to an optimal temperature condition of the battery 15 for each gear number by changing the threshold of the temperature of the battery 15 at the shift of the regeneration when the clutch 12 is in the disengaged state and the regeneration when the clutch 12 is in the engaged state according to the gear number. This can eliminate a redundant control of the disengagement and the engagement of the clutch 12, and can curb the increase in the temperature of the battery 15 while curbing the decrease in the SOC of the battery 15.

Further, the occurrence of the above-mentioned mode hunting can be avoided by making the threshold when the clutch 12 is shifted from the disengaged state to the engaged state (the increase threshold) and the threshold when the clutch 12 is shifted from the engaged state to the disengaged state (the decrease threshold) differ from each other. This can curb the fuel consumption by the engine 10 and can cause the engine 10 to be fuel efficient.

(Other Embodiments)

The values of the boundaries for determination can variously be changed, for example, the "equal to or larger than" can be changed into "exceeds" and the "less than" can be changed into "equal to or less than" in the description of the flowchart illustrated in FIG. 3.

The thresholds of all gear numbers (from the second speed to the fifth speed) differ from each other in the example of FIG. 4. However, FIG. 4 is an example for the sake of clarity and the setting of the thresholds is not limited to the example. In other words, the threshold of at least one of the gear numbers has to differ from the thresholds of the other gear numbers. For example, the same threshold can be set at the fifth speed (5th) and the fourth speed (4th). In that case, it is preferable that the threshold at the fifth speed is also set as the threshold at the fourth speed. In other words, the higher the gear number is (the smaller the gear ratio is), the smaller the braking force of the engine brake is. Thus, it takes a long time to reduce the speed and the amount of the regenerative power generation is also large. Accordingly, it is better to set the threshold at the fourth speed as low as the threshold at the fifth speed on the safe side because the rate of increase in the temperature of the battery 15 at the fifth speed is further higher than that at the fourth speed.

Further, at the same gear number, it takes more time to reduce the speed when the cargo of the hybrid vehicle 1 is at the rated load and the gross weight is large in comparison with the case when the cargo of the hybrid vehicle 1 has a void space and the gross weight is small. Thus, as described above, the threshold can be changed to be low when the gross weight of the hybrid vehicle 1 is large in addition to the change of the threshold according to the gear number during deceleration.

Although the engine 10 has been described as an internal combustion engine, the engine 10 can also be a heat engine including an external combustion engine.

Further, while the program executed by the hybrid ECU 18 is installed on the hybrid ECU 18 in advance in the above description, the program can be installed on the hybrid ECU 18 as a computer by attaching removable media recording the program (storing the program), for example, to a drive (not shown in the drawings) and storing the program read from the removable media in a non-volatile memory inside the hybrid ECU 18, or receiving, by a communication unit (not shown in the drawings), a program transmitted through a wired or wireless transmission medium and storing the program in a non-volatile memory inside the hybrid ECU 18.

Further, each ECU can be implemented by an ECU combining each of the ECUs. Alternatively, an ECU can newly be provided by the further subdivision of the function of each ECU.

Note that the program executed by the computer can be one for performing the process in chronological order according to the order described herein or can be one for performing the process in parallel or at the necessary timing, for example, when the program is invoked.

Further, the embodiments of the present invention are not limited to the above-mentioned embodiments, and can be variously modified without departing from the gist of the invention.

The invention claimed is:

1. A regeneration control device of a hybrid vehicle that includes an engine, an electric motor and a battery configured to supply electric source to the electric motor, that is capable of running by the engine or the electric motor or capable of running by a cooperation between the engine and the electric motor, that is capable of performing regenerative power generation for charging the battery by the electric motor at least during deceleration, and that is capable of disconnecting the engine from the electric motor in the regenerative power generation during deceleration, the regeneration control device comprising:

temperature detecting means detecting a temperature of the battery; and
    control means controlling to connect the engine with the electric motor in the regenerative power generation during deceleration when the temperature detecting means detects a temperature of the battery that is equal to or exceeds a predetermined temperature,
    wherein the control means sets the predetermined temperature according to a gear number during the deceleration of the hybrid vehicle.

2. The regeneration control device according to claim 1, wherein, the control means, after controlling to connect the engine with the electric motor in the regenerative power generation during deceleration when the temperature detecting means detects a temperature of the battery that is equal to or exceeds a predetermined temperature, controls to disconnect the engine from the electric motor in the regenerative power generation during deceleration when the temperature detecting means detects a temperature of the battery that is equal to or less than a predetermined temperature.

3. The regeneration control device according to claim 2, wherein the control means sets the predetermined temperature higher at a gear number having a larger gear ratio.

4. The regeneration control device according to claim 3, wherein, a predetermined temperature that is a threshold when the control means controls to shift a state from the state in which the engine is disconnected from the electric motor to the state in which the engine is connected to the electric motor differs from a predetermined temperature that is a threshold when the control means controls to shift a state from the state in which the engine is connected to the electric motor to the state in which the engine is disconnected from the electric motor at the same gear number.

5. The regeneration control device according to claim 2, wherein, a predetermined temperature that is a threshold when the control means controls to shift a state from the state in which the engine is disconnected from the electric motor to the state in which the engine is connected to the electric motor differs from a predetermined temperature that is a threshold when the control means controls to shift a state from the state in which the engine is connected to the electric motor to the state in which the engine is disconnected from the electric motor at the same gear number.

6. The regeneration control device according to claim 1, wherein the control means sets the predetermined temperature higher at a gear number having a larger gear ratio.

7. The regeneration control device according to claim 1, wherein, a predetermined temperature that is a threshold when the control means controls to shift a state from the state in which the engine is disconnected from the electric motor to the state in which the engine is connected to the electric motor differs from a predetermined temperature that is a threshold when the control means controls to shift a state from the state in which the engine is connected to the electric motor to the state in which the engine is disconnected from the electric motor at the same gear number.

8. A hybrid vehicle comprising the regeneration control device according to claim 1.

* * * * *